Jan. 26, 1954 — P. DANDRIDGE — 2,667,355

RECORD STACK INVERTER FOR AUTOMATIC PHONOGRAPHS AND DISK RECORD PLAYERS

Filed June 9, 1950

3 Sheets-Sheet 1

INVENTOR.
PAUL DANDRIDGE,
BY
Albert J. Jacobs
ATTY.

Jan. 26, 1954

P. DANDRIDGE 2,667,355

RECORD STACK INVERTER FOR AUTOMATIC PHONOGRAPHS AND DISK RECORD PLAYERS

Filed June 9, 1950

3 Sheets-Sheet 2

INVENTOR.
PAUL DANDRIDGE.
BY
Albert [illegible]
ATTY.

INVENTOR.
PAUL DANDRIDGE.
BY
ATTY.

Patented Jan. 26, 1954

2,667,355

UNITED STATES PATENT OFFICE 2,667,355

RECORD STACK INVERTER FOR AUTOMATIC PHONOGRAPHS AND DISK RECORD PLAYERS

Paul Dandridge, Philadelphia County, Pa., assignor of forty per cent to Mrs. Jessie V. Ondo, Philadelphia, Pa.

Application June 9, 1950, Serial No. 167,126

7 Claims. (Cl. 274—10)

This invention relates to a handling and inverting device for disc records and more particularly to an auxiliary attachment adapted to be used in connection with a phonograph or record player having an automatic record changer in such manner that after a stack of records has been fed to the phonograph or record player and the last such record played, my attachment grips the stack of records, lifts them off the turntable, turns them over as a group and deposits them in position for the automatic record player to feed the records one by one back to the turntable to enable the other side of each record thus to be played without manually handling the records.

There are various devices available today for use in connection with phonographs or record players which are adapted to feed disc records one by one to the turntable of a phonograph or record player until the entire stack of records has been played on one side. These devices are not ordinarily provided with any means for enabling the other sides of such records to be played and, consequently, it has been heretofore necessary to remove the stack of records manually, to turn them over and to put them back into the record changer in order that the other sides may be played through the further feeding of the records in the inverted position.

It is inconvenient and undesirable to carry out these operations manually and such, moreover, necessitates watching the record player or providing an attendant or the interrupting of the duties of others to attend thereto. Such manual handling is frequently done hastily or carelessly, resulting in improper positioning of the records and/or damage thereto. So far as I am aware, there is no completely automatic mechanical device which makes it possible to play records on one side and then to invert the stack to play the other side, without the intervention of an operator or attendant, although it has been proposed automatically to invert each record individually after it has been played but such differs from the invention here involved.

It is, accordingly, one of the objects of this invention to provide a device in the form of an auxiliary record handling mechanism which is associated with a phonograph or record player and its automatic record changer and which makes it possible to remove a stack of played records and invert them as a stack, thereby enabling them to be played on their other side without manual intervention.

Another object of the invention resides in the provision of a device mounted contiguous to the turntable and tone arm of a phonograph or record player and operatively associated with an automatic record changer so as to remove from said turntable a completely played stack of records as a unit, to lift and invert them and to place them in position for the record changer to handle the same in their inverted position.

A further object of the invention comprises a motor-operated pair of spaced, helical, tubular cylinders which are provided with, and actuate, opposed grippers which move radially inwardly to take hold of a stack of records which is thereafter lifted off the turntable, inverted and placed in position for re-playing on their opposite sides.

Other and further objects and advantages reside in the combinations, sub-combinations and details hereinafter described and in such other and further features as will be understood and appreciated by those skilled in this art or which will be apparent or pointed out hereinafter.

In the accompanying drawings wherein I have illustrated preferred embodiments of the invention:

Figure 1:
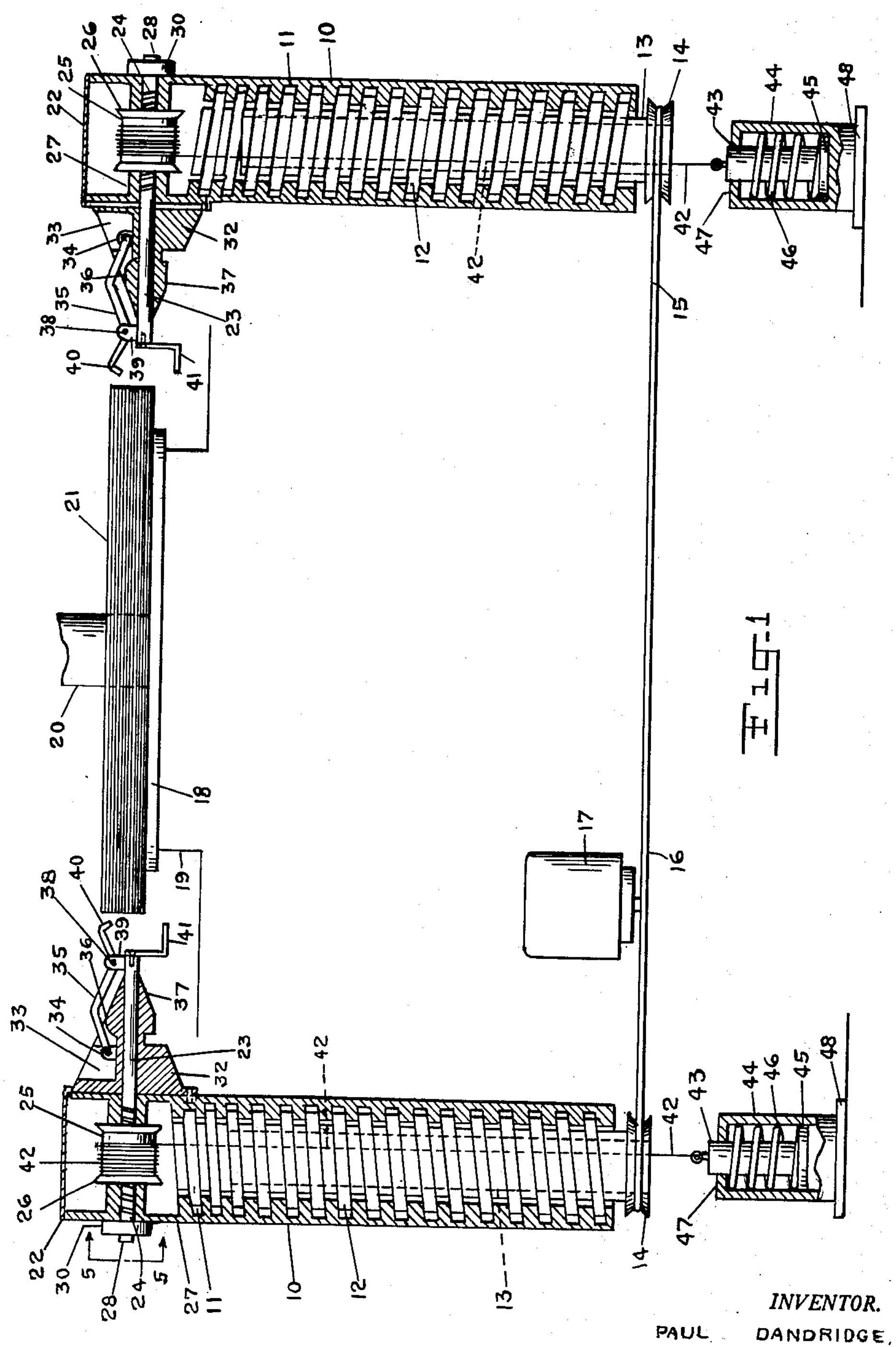
Fig. 1 is a vertical, sectional view, partly in elevation, of my new record handling device shown in association with a turntable having a stack of records thereon but illustrating the grippers in retracted, inoperative position.

Referring now to the drawings in detail, it will be observed that I provide a pair of spaced, opposed, vertically arranged hollow cylinders 10 which are provided internally throughout the major portion of their height with helical grooves 11 in which are adapted to operate the elongated worm or helical gears 12 which are on and/or form a part of hollow, vertical shafts 13, each of which terminates at its lower end in a pulley or the like 14, adapted to be driven by the belt 15 which passes around both pulleys for the purpose of synchronizing the movements of the worm gears and which is connected in any suitable or known manner to, and is driven by, the pulleys or wheel 16 of reversible electric motor 17, it being understood that these members are all mounted in operative association with the turntable 18 of a phonograph or record player fragmentarily indicated at 19 and which turntable 18 is provided with the usual upstanding hub or shaft 20 which acts as a center and guide for the records, a stack of which is indicated at 21 and which is made up of a plurality of individual records superimposed one upon the other as occurs after a stack, set or series of such records has been played on an automatic phonograph or record player.

It will be understood further that the shafts 13 are stationarily mounted or fixed so that, when the pulleys 14 are turned, the cylinders 10 are raised and lowered, depending upon the direction of movement of the belt as controlled by the motor 17, which is suitably concealed in the phonograph cabinet or the like, not shown, or which may in some cases be remotely disposed for actuation from a distance or through a partition, wall or the like, if preferred or desired. The cylinders 10 are shown in lowered position in Figs. 1 and 2 and in raised position in Fig. 3.

As cylinders 10 are raised and lowered, associated record gripping, lifting and inverting mechanisms are correspondingly raised and lowered and brought into effective action since, as shown, the latter are mounted at the upper ends of such cylinders. These mechanisms each comprise a hollow housing 22 through which passes a radially disposed rotatable shaft 23 the radially inner portion of which is smooth but the radially outer portion of which is provided with a worm gear, as indicated at 24, this worm gear having a flanged pulley 25 mounted for operation thereon and, for that purpose, having an internal helical groove meshing with worm gear 24 to cause, as will be hereinafter more fully explained, a small amount of radially inward and outward movement of gripper shafts 23. The internal diameter of each pulley 25 flanged at 26 is such as to enable the pulley to receive the sleeve or bushing 27, gripper shaft 23 being mounted, as shown in Figs. 1 and 2, so that it extends through said sleeve or bushing in a transverse and radial direction with relation to the cylinders 10 and turntable 18, respectively.

Each of the gripper shafts 23 has its radially outer end 28 which projects outside the housing 22 provided with a helical spring 29 mounted in a casing 30. One end of spring 29 (the outer end) is anchored to an adjacent portion of the cylinder 10, as shown at 31 in Fig. 5, and the other end (the inner end) of such spring is connected into a slot, opening or the like formed in the shaft 23 so that rotational movements of shaft 23 will result in winding and unwinding action upon spring 29, depending, of course, upon the direction of rotation of such shaft.

Figures 2, 3, 4, 5, 6, 7, 8, 9, 10:
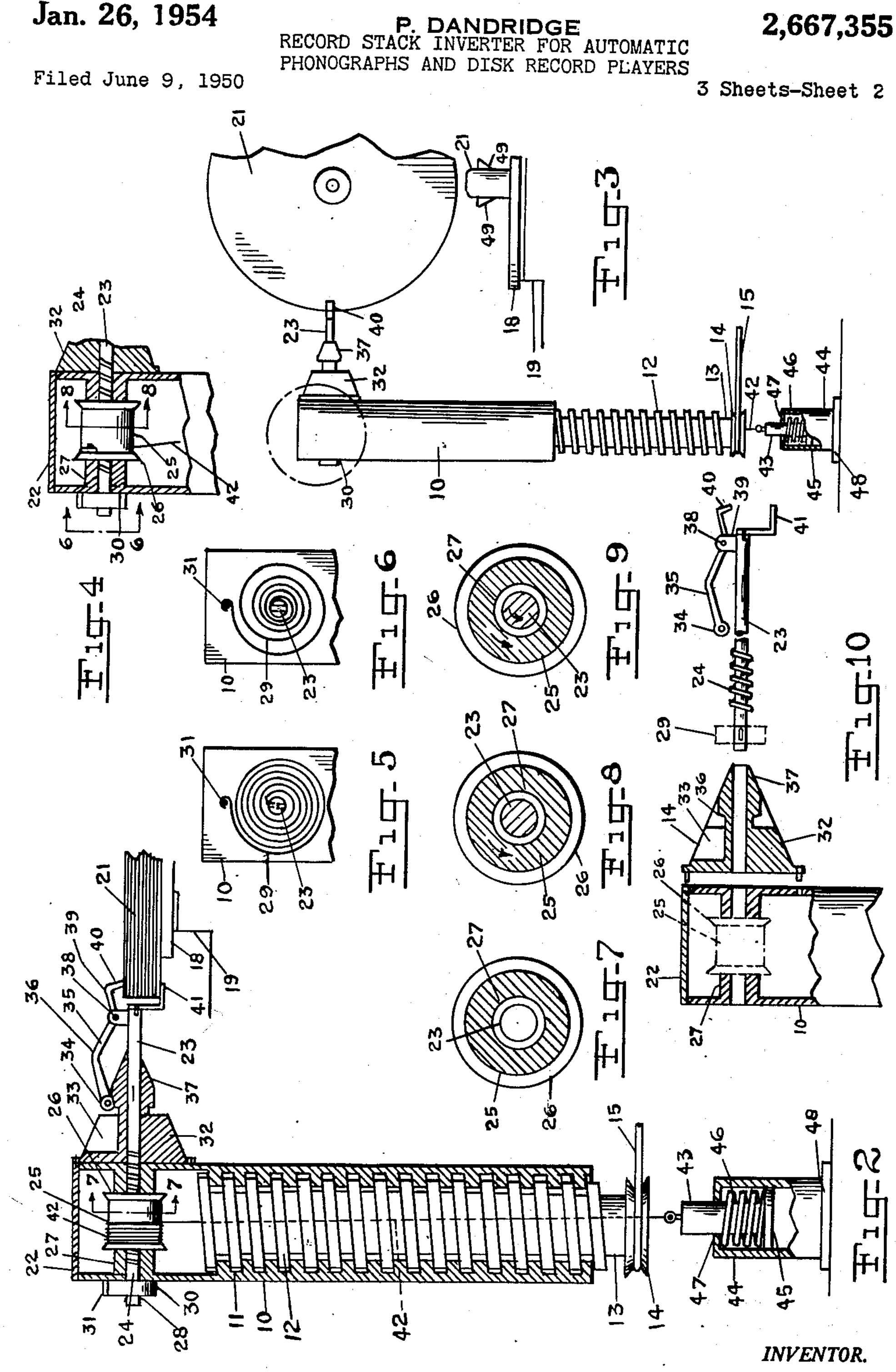
Fig. 2 is a fragmentary view of the left-hand portion of Fig. 1 but showing the grippers advanced and in operative position with respect to a stack of records, in readiness to lift the same from the turntable.
Fig. 3 is a view generally similar to Fig. 2 but showing the parts primarily in vertical elevation and illustrating the records in the act of being turned over.
Fig. 4 is an enlarged view of that portion of Fig. 3 which is within the phantom circle but broken away and sectioned to illustrate the internal construction and the position of the parts during the turning movement.
Fig. 5 is a fragmentary, elevational view of that portion of Fig. 1 indicated by the line 5—5 and illustrating the helical spring in an unwound condition.
Fig. 6 is a view similar to Fig. 5, taken along line 6—6 of Fig. 4, illustrating the helical spring in a wound condition during which the stack of records is being turned.
Figs. 7, 8 and 9 are detail views in the form of transverse sections taken through the gripper shaft and pulley of Fig. 2 along line 7—7 thereof and showing the parts in the various conditions existing or occurring during operation.
Fig. 10 is a detail, fragmentary view, partly in elevation and partly in section, of one of the gripper operating mechanisms and showing certain of the parts in disassociated condition, the better to illustrate the details of construction thereof

The other (radially inner) end of each such shaft 23 extends through a conically-shaped cam-like member 32 the base of which abuts, and is secured to, cylinder 10 (see Fig. 10). Member 32 is cut away to provide a recess 33 within which the roller 34, journaled on the end of upper gripper arm 35, is adapted to be received when the grippers are in retracted, inoperative position. Member 32 is also provided with a contoured portion 36 which acts as a cam and a tapered outer end 37, for purposes of guiding roller 34 and the movements of arm 35 during the advancing and retracting movements of the grippers. Arm 35 is fulcrumed at 38 in a bracket 39 mounted on the outer end of shaft 23 and this arm terminates in a hook-like end portion 40 which constitutes the upper jaw or member of the gripper. An L-shaped member 41 is mounted in the inner end of shaft 23 and the horizontal portion thereof constitutes the lower jaw or member of the gripper and a rest or support for a stack of records.

Each of the flanged pulleys 25 has a wire cable 42 wound thereon and one end of which passes down through the shaft 13, which is hollow for that purpose, and is secured to a piston 43 which is mounted in a casing 44 disposed in any convenient subjacent location with relation to the phonograph or record player. The lower end of piston 43, which is preferably cylindrically shaped, is flanged as shown at 45 and a strong helical spring 46 encircles piston 43 between flange 45 and the top apertured portion 47 of the casing 44. Thus, when tension is exerted on cable 42 as by the upward movement and/or rotation of flanged pulley 35, the piston 43 is moved upwardly thereby compressing spring 46 for the purpose of controlling and correlating independent and relative movements of shaft 23 and flanged pulley 25, which are capable of movement relatively to each other and also as a unit. The base 48 of casing 44 is fixedly mounted on any conveniently located supporting surface.

Figure 11:
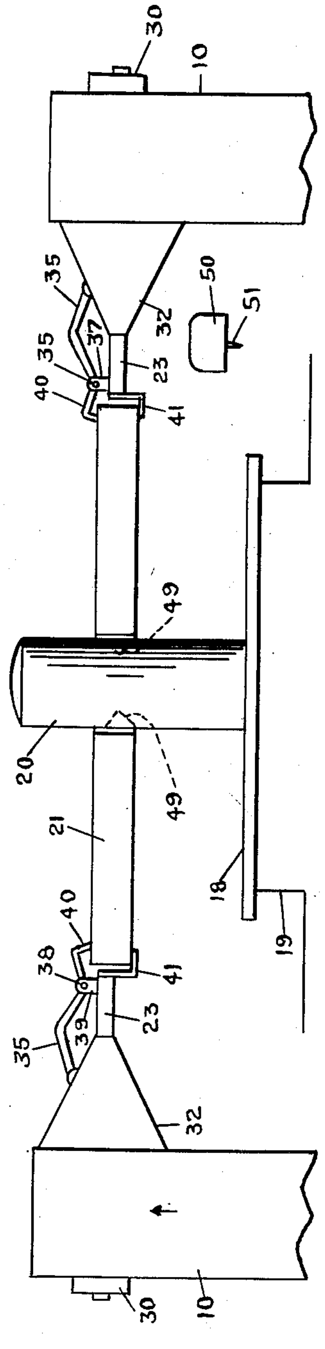
Figs. 11 and 12 are schematic, fragmentary, elevational views showing the invention in association with known turntable and record changer devices.
Figure 12:
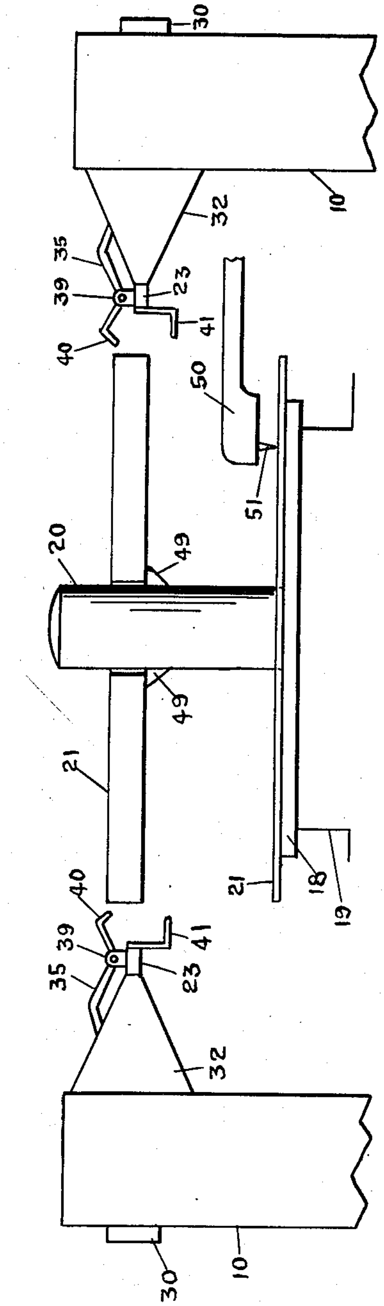

In operative association with the turntable 18 of the phonograph or record player, I provide a known form of hub or shaft 20 which is constructed to hold a stack of records in an elevated position with respect to the turntable 18 so that one record at a time can be released and played. This involves the radial injecting and supporting elements 49 which have a collapsed neutral position, as shown in Fig. 11, in which such elements are moved within the confines of the shaft so as to exert no obstructive action with respect to the vertical movement of records and an operative or active position, as shown in Fig. 12, in which said elements are in a radially projecting position so as to form a support for records in vertically spaced relationship above the turntable 18. Such construction per se forms no part of the present invention nor does it constitute a limitation thereon.

The horizontally, swingable tone arm 50 of the phonograph or record player has a needle or stylus 51 in the usual manner for following the grooves in the records 21 for record reproducing or playing purposes and the entire gripping, lifting and turning mechanism, in accordance with this invention, may be and preferably is electrically controlled by such tone arm so that, when the tone arm moves to its innermost position, it actuates a switch or closes a circuit which sets my new lifting and turning device into operation. However, this automatic operation may, alternatively, be effected by having the same actuated after a predetermined period of time. In other words, the operation may be on a timed basis since it takes a definite period of time to play a series of records of given or known size at usual speeds. While the present invention is particularly designed for use with 45 R. P. M. records, nevertheless by suitable modifications which will be readily understood by those skilled in this art the invention may be adapted for use with other types of records such as standard 78 R. P. M. records or 33⅓ R. P. M. records. The use of swingable tone arm to operate an associated device is also per se known.

In operation, it will be understood from the foregoing that when the reversible motor 17 is actuated in any of the manners described above, or manually if preferred, the belt 15 causes synchronized turning of shafts 13 which causes cylinders 10 to rise from their lowermost position, as shown in Figs. 1 and 2, to their uppermost position, as shown in Fig. 3. As cylinders 10 rise, tension is placed upon cables 42 and pistons 43 which rise against the force of springs 46, compressing the latter. This tension also causes a certain amount of turning of the pulleys 25 on shafts 23 so that the shafts are advanced radially inwardly and, as such occurs, the rollers 34 ride up over the cam portions 38 so as to raise and advance the upper gripper jaws 40 into position ready to contact the upper surface of the stack of records (see Fig. 2) whereas the lower gripping jaw members 41 are advanced into the position also shown in Fig. 2 and, as the cylinders 10 continue to rise, the stack of records 21 is lifted vertically upwardly with respect to turntable 18 and hub or shaft 20. As this movement continues, the relative movements of shafts 23 and flanged pulleys 25 have also caused the spiral springs 29 to be wound and, depending upon the size and strength of such springs and their relationship to the size and strength of springs 46, this results in a condition in which springs 29 contain an excess of energy so that thereafter they effect a rotational movement upon shafts 23, this being arranged to take place at the upper limit of movement of cylinders 10. Fig. 3 shows the position in which the records have been turned through an angle of 90° and thereafter the records are turned an additional 90° until they are completely inverted, at which time they are automatically replaced in or upon the automatic record player which initially fed them to the turntable one by one, this action being permitted by the changing cable and spring tensions of the parts above described and this reverse movement begins to take place by reversing the motor 17 manually or automatically so as to cause the elements to follow the opposite sequence of movements until eventually they deposit the records in inverted position, the grippers are opened and retracted and the cylinders have reached their initial (lowermost) positions.

In this way a stack of records may be removed automatically from a phonograph or record player, may be lifted into the air and inverted and then deposited again in operative association with the automatic record changer so that the records are fed one by one for play-back purposes with their opposite sides uppermost. Thus, any automatic record changer or player can be modified so that the other side of the stack or group of records involved can be automatically played.

It will be understood that the foregoing is presented as illustrative and not as limitative since other and further modifications may be made without departing from the invention as defined by the appended claims.

I claim:

1. An attachment for automatic record players, which comprises means for gripping a stack of records as a unit, means for raising such stack of records and inverting the same while still maintaining it as a unit and for lowering the inverted stack of records into a position in which the said records may be played on their other sides and then releasing such records, the second means including hollow, vertical, helically threaded cylinders, helically threaded, hollow vertical shafts adapted to engage said cylinders which are adapted to move upwardly and downwardly thereon, pulleys for driving said shafts in either direction of rotation and tensioning means connected via said hollow shafts to the gripping means for effecting predetermined changes of tension for controlling independent and relative movements of said gripping means.

2. In an attachment of the character described, a pair of vertically movable, internally threaded cylinders, vertical, stationary threaded hollow shafts in said cylinders, horizontal shafts mounted in the upper ends of such cylinders and having a plain portion and a threaded portion, flanged pulleys mounted upon such shafts and having threaded bores engageable with the threaded portions of such shafts, cables wound upon such pulleys and extending downwardly through the hollow shafts and connected at their lower ends to a yieldable tensioning device, helical springs housed at the outer end of said horizontal shafts and connected thereto so that rotational movements of such shaft effect winding and unwinding of helical springs for controlling independent and relative movement of such shaft, a pair of gripping jaws mounted at the radially inner end of each such horizontal shaft, and cam and follower means for opening and closing said jaws, said shafts being somewhat movable radially inwardly and outwardly to bring the jaws into gripping contact with a stack of records and to withdraw such jaws from contact therewith at predetermined times.

3. Mechanism for handling a stack of disc records as a unit, which comprises a pair of cylinders arranged diametrically oppositely with respect to said records, grippers mounted near the top of said cylinders and having jaws which are capable of being opened and closed, means for advancing said jaws and closing them upon said records, means for elevating said cylinders, jaws and records, means for inverting said stack of records in elevated position, means for lowering the inverted stack of records and means for opening and retracting said jaws, said grippers including hollow bushings extending transversely of said cylinders, flanged pulleys mounted on said bushings, gripper shafts extending through said bushings and pulleys, tensioning means associated with and acting upon said shafts and pulleys and cam-like means for controlling jaws mounted at the ends of said gripper shafts.

4. Mechanism as defined in claim 3 in which said cylinders are vertically disposed, hollow and internally threaded, an externally threaded hollow shaft in each of said cylinders and stationarily mounted so that turning movements of said hollow shafts effect raising and lowering movements of said cylinders.

5. Mechanism as defined in claim 3 in which said cylinders are vertically disposed, hollow and internally threaded, an externally threaded hollow shaft in each of said cylinders and stationarily mounted so that turning movements of said hollow shafts effect raising and lowering movements of said cylinders, a cable wound upon each such pulley and having its other end anchored to a subjacent piston which is normally spring-urged in a downward direction.

6. Mechanism as defined in claim 3 in which said cylinders are vertically disposed, hollow and internally threaded, an externally threaded hollow shaft in each of said cylinders and stationarily mounted so that turning movements of said hollow shafts effect raising and lowering movements of said cylinders, a cable wound upon each such pulley and having its other end anchored to a subjacent piston which is normally spring-urged in a downward direction, said gripper shafts being disposed in a radial direction with respect to said records and being provided at their outer ends with a helical spring secured thereto so that turning movements of said shafts effect winding and unwinding action of said spring.

7. In combination with an automatic record player, mechanism mounted adjacent said record player for gripping a stack of played records as a unit and for inverting the same and depositing it in a position in which the opposite sides of said records can be played, said mechanism including oppositely disposed, radially positioned gripping shafts each of which is provided on its radially inner end with a pair of gripping jaws which are normally in a retracted, open, inoperative position, means for advancing said gripper jaws and closing them upon said record stack and means for imparting raising and turning movements to said gripping jaws and records, vertical cylinders to which said gripping shafts are secured and means associated with said cylinders for imparting upward and downward movements thereto.

PAUL DANDRIDGE.

References Cited in the file of this patent

UNITED STATES PATENTS

| Number | Name | Date |
|---|---|---|
| 1,920,360 | Darwin | Aug. 1, 1933 |
| 2,058,842 | Thompsett et al. | Oct. 27, 1936 |
| 2,097,323 | Hill | Oct. 26, 1937 |
| 2,339,062 | Davis et al. | Jan. 11, 1944 |

FOREIGN PATENTS

| Number | Country | Date |
|---|---|---|
| 410,746 | Great Britain | May 15, 1934 |